US008605830B2

(12) United States Patent
Sethi et al.

(10) Patent No.: US 8,605,830 B2
(45) Date of Patent: Dec. 10, 2013

(54) BLIND CARRIER/TIMING RECOVERY AND DETECTION OF MODULATION SCHEME

(75) Inventors: Ankit Sethi, Kharagpur (IN); Baijayanta Ray, Bangalore (IN)

(73) Assignee: National Instruments Corporation, Austin, TX (US)

( * ) Notice: Subject to any disclaimer, the term of this patent is extended or adjusted under 35 U.S.C. 154(b) by 362 days.

(21) Appl. No.: 12/977,491

(22) Filed: Dec. 23, 2010

(65) Prior Publication Data

US 2012/0027131 A1 Feb. 2, 2012

(30) Foreign Application Priority Data

Jul. 30, 2010 (IN) .......................... 1794/DEL/2010

(51) Int. Cl.
*H04L 27/06* (2006.01)
(52) U.S. Cl.
USPC ........... 375/340; 375/268; 375/269; 375/270; 375/271; 375/272
(58) Field of Classification Search
USPC .................................. 375/316, 340, 268–272
See application file for complete search history.

(56) References Cited

U.S. PATENT DOCUMENTS

| 6,975,839 | B2* | 12/2005 | Reid | 455/75 |
| 7,720,179 | B2* | 5/2010 | Li et al. | 375/326 |
| 2008/0240295 | A1* | 10/2008 | Kim | 375/321 |
| 2008/0291991 | A1* | 11/2008 | Su | 375/232 |
| 2012/0236976 | A1* | 9/2012 | Smith | 375/350 |

OTHER PUBLICATIONS

Skewness, Wikipedia, the free encyclopedia; http://en.wikipedia.org/wiki/Skewness, 7 pages. [Retrieved Oct. 3, 2011].
U.S. Appl. No. 13/109,338, filed May 17, 2011, 43 pages.

* cited by examiner

*Primary Examiner* — Chieh M Fan
*Assistant Examiner* — Freshteh N Aghdam
(74) *Attorney, Agent, or Firm* — Meyertons Hood Kivlin Kowert & Goetzel, P.C.; Jeffrey C. Hood; Mark K. Brightwell

(57) ABSTRACT

Systems and methods and memory media for performing modulation type detection. An attempt is made to estimate an underlying symbol rate of a received signal. The received signal is compensated for carrier frequency offset. Two candidates for symbol timing offset are estimated from the compensated signal. The compensated signal is downsampled using each offset candidate. A set of features is computed for each of the two downsampled signals. For each downsampled signal, the set of features is compared to a corresponding set of thresholds to obtain a corresponding set of comparison results. The two sets of comparison results are used to determine the modulation type of the received signal. A second method for estimating symbol rate may be performed if the modulation type is found to be FSK.

19 Claims, 9 Drawing Sheets

BLIND CARRIER/TIMING RECOVERY AND DETECTION OF MODULATION SCHEME

RELATED APPLICATION DATA

This application claims the benefit of priority under 35 U.S.C. 119 to Indian Provisional Application No. 1794/DEL/2010, filed with the Patent Office of India on Jul. 30, 2010, titled "Various Receiver Systems and Methods", and invented by Baijayanta Ray, Nikhil Ashok Deshmukh, Pratik Prabhanjan Brahma, Ankit Sethi, Kunal Agarwal, Sartaj Chaudhury, and Utkarsh Gupta. That Provisional Application is hereby incorporated by reference in its entirety as though fully and completely set forth herein.

FIELD OF THE INVENTION

The present invention relates to the field of telecommunication, and more particularly, to systems and methods for performing modulation-type identification on a received signal.

DESCRIPTION OF THE RELATED ART

A transmitter receives an information signal, modulates the information signal onto a carrier signal, and transmits the modulated carrier onto a channel. The modulation is performed according to any of a variety of known modulation schemes. The information signal may be an analog signal or a digital signal. A receiver system receives a noise-perturbed version of the transmitted signal from the channel. It is assumed that the receiver system does not know a priori the modulation scheme used by the transmitter. Thus, before the information signal can be recovered from the received signal, the modulation scheme should be determined. There exists a need for systems and methods capable of estimating the modulation scheme based on samples of the received signal. Also there exists a need for systems and methods capable of performing carrier frequency offset estimation, for performing symbol timing offset estimation, for estimating symbol rate.

SUMMARY

Embodiments of the invention may be used in a receiver system, such as any of various communication devices. A method for performing modulation type identification may involve the following processing operations.

First, the method may include receiving samples $\{y(n)\}$ of a received signal.

Second, the method may include computing an estimate of carrier frequency offset based on a frequency location of a largest peak in a magnitude spectrum $S(k)$, wherein the magnitude spectrum $S(k)$ is computed from the samples $\{y(n)\}$ according to the expression $S(k)=|DFT\{y(n)^8\}|$, wherein DFT denotes the discrete Fourier transform.

Third, the method may include applying a frequency correction to the samples $\{y(n)\}$ based on the estimate of the carrier frequency offset in order to obtain samples $\{v(n)\}$.

Fourth, the method may include computing an estimate of symbol rate of the received signal by searching for a largest peak in a spectrum $T(f)$ over a frequency range, wherein the spectrum $T(f)$ is computed from the samples $\{v(n)\}$ according to the relation $T(f)=DFT\{|v(n)|^2\}$.

Fifth, the method may include computing two candidate values for symbol time offset from a value $g(N)$ given by $$g(N) = \frac{N}{4\pi}\arg\left[\left(\sum_i v^2(i)\exp(2\pi i/N)\right)\left(\sum_i v^2(i)\exp(-2\pi i/N)\right)^*\right],$$

wherein N is a first estimate of an oversampling factor, wherein N is determined by the symbol rate estimate and a known value of sampling rate.

Sixth, the method may include: downsampling the samples $\{v(n)\}$ based on the symbol rate estimate and a first of the two candidate values for the symbol time offset in order to determine a first symbol sequence; and downsampling the samples $\{v(n)\}$ based on the symbol rate estimate and a second of the two candidate values for the symbol time offset in order to determine a second symbol sequence.

Seventh, the method may include operating on the first and second symbol sequences to determine a type of modulation that was used to generate the received signal.

In some embodiments, the action of computing the estimate of the carrier frequency offset may include determining that a kurtosis of the magnitude spectrum $S(k)$ in a neighborhood of the frequency location is larger than a threshold.

In some embodiments, the frequency range for said search is of the form $[k_1 OBW, k_2 OBW]$, wherein scalar $k_1$ is less than one, wherein scalar $k_2$ is greater than one, wherein a frequency $f_P$ of the largest peak represents the estimate for the symbol rate of the received signal.

In some embodiments, the method may also include displaying an indication of the modulation type via a display device.

In some embodiments, the method may also include: demodulating the first symbol sequence or the second symbol sequence based on the determined modulation type to recover information bits; and driving an output device with an output signal derived from the information bits.

In some embodiments, the method may also include: in response to a determination that the modulation type is FSK, searching for a value $\alpha_{MAX}$ that maximizes a first derivative of function $f(\alpha)$ over a range of $\alpha$ of the form $[c_1 OBW/f_S, c_2 OBW/f_S]$, wherein $f_S$ is the known value of the sampling rate, wherein scalar $c_1$ is less than one, wherein scalar $c_2$ is greater than one, wherein $f(\alpha)$ is given by the expression:

$$f(\alpha) = \log\sum_{j=0}^{K-1}\left|\sum_{n=0}^{M-K-1} v^*(n)v(n+j)\cos(2\pi\alpha n)\right|^2$$

wherein K is a positive integer, wherein M is a positive integer, wherein an inverse of $\alpha_{MAX}$ represents a second estimate of the oversampling factor. The samples $\{v(n)\}$ may be downsampled to symbol rate using the second estimate of the oversampling factor.

Another method for performing modulation type identification may include the following processing operations.

First, the method may include receiving samples $\{y(n)\}$ of a received signal.

Second, the method may include scaling the samples $\{y(n)\}$ to obtain samples $\{x(n)\}$ having average power equal to a predetermined constant.

Third, the method may include computing a spectrum $X(k)$ according to the relation $X(k)=DFT\{x(n)\}$, wherein DFT denotes the discrete Fourier transform.

Fourth, the method may include computing a set of features (described below).

Fifth, the method may include performing comparisons of the features to corresponding threshold values.

Sixth, the method may include determining a modulation type of the received signal from a set of modulation types based on results of said comparisons, wherein the set of modulation types includes QAM and a plurality of PSK modulation types.

The set of features may include: a maximum of a set of sixth order cumulants given by $\{C_{63}(x(n)), C_{63}(x(n)^2), C_{63}(x(n)^4)\}$; the sixth order cumulant $C_{63}(x(n))$; a skewness relative to index j of a first sequence given by $\{E_k[X'(k+P,j)X'(k,j)^*]\}$, wherein $E_k$ denotes an expected value relative to index k, where $X'(k,j)$ is a magnitude spectrum derived from an initial spectrum $B'(k,j)=|DFT_{N/2P}\{x^4(n+kN/2P)\}|$ by deleting a maximum element from the initial spectrum, wherein $DFT_{N/2P}$ denotes an N/2P-point discrete Fourier transform; a normalized variance of the first sequence; a variance of a second sequence given by $\{2|arg(x^4(n)(x^4(n-1))^*)|mod(2\pi)\}$; a variance of a third sequence given by $$\left\{\frac{|x(n) - E(x(n))|}{RMS(|x(n) - E(x(n))|)}\right\};$$

and a magnitude $|X(0)|$ of the spectrum $X(k)$ at zero frequency.

In some embodiments, the plurality of PSK modulation types may include at least BPSK, QPSK and 8-PSK.

In some embodiments, the method may also include: demodulating the received signal according to the determined modulation type in order to recover information bits; generating an output signal based on the information bits; and driving an output device such as a display or speaker based on the output signal.

In some embodiments, the set of modulation types may also include FM, AM, AM-SSB, ASK and FSK, and the set of features also includes: a normalized variance of $\{|x(n)|^2\}$; a kurtosis of a centered and normalized version of an instantaneous frequency signal $\{\omega(n)\}$, wherein the instantaneous frequency signal is derived from the samples $\{x(n)\}$; a skewness of a centered and normalized version of $\{|x(n)|\}$; and a maximum of PL and PR, wherein PL is a normalized power associated with a left half of the spectrum $X(k)$, wherein PR is a normalized power associated with a right half of the spectrum $X(k)$.

Yet another method for performing modulation type identification may include the following processing operations.

First, the method may include sampling an input signal at a rate higher than a symbol rate of the input signal in order to determine samples $\{y(n)\}$.

Second, the method may include calculating two candidate values for symbol timing offset based on the samples $\{y(n)\}$.

Third, the method may include: downsampling the samples $\{y(n)\}$ to the symbol rate using a first of the two candidate values for symbol timing offset in order to obtain a first symbol sequence $\{x_1(n)\}$; and downsampling the samples $\{y(n)\}$ to the symbol rate using a second of the two candidate values for symbol timing offset in order to obtain a second symbol sequence $\{x_2(n)\}$.

Fourth, the method may include performing two evaluations of a set of features (described below), wherein a first of the two evaluations is based on the first symbol sequence, wherein a second of the two evaluations is based on the second symbol sequence.

Fifth, the method may include determining a modulation type of the input signal based on the values resulting from said two evaluations of the set of features.

In terms of a given symbol sequence $\{x(n)\}$, the set of features may include: a maximum of a set of sixth order cumulants given by $\{C_{63}(x(n)), C_{63}(x(n)^2), C_{63}(x(n)^4)\}$; the sixth order cumulant $C_{63}(x(n))$; a skewness relative to index j of a first sequence given by $\{E_k[X'(k+P,j)X'(k,j)^*]\}$, wherein $E_k$ denotes an expected value relative to index k, where $X'(k,j)$ is a magnitude spectrum derived from an initial spectrum $B'(k,j)=|DFT_{N/2P}\{x^4(n+kN/2P)\}|$ by deleting a maximum element from the initial spectrum, wherein $DFT_{N/2P}$ denotes an N/2P-point discrete Fourier transform; a normalized variance of the first sequence; a variance of a second sequence given by $\{2|arg(x^4(n-1))^*)|mod(2\pi)\}$; and a variance of a third sequence given by $$\left\{\frac{|x(n) - E(x(n))|}{RMS(|x(n) - E(x(n))|)}\right\}.$$

In some embodiments, the method may also include: demodulating the samples $\{x_1(n)\}$ or the samples $\{x_2(n)\}$ according to the determined modulation type in order to recover information bits; generating an output signal based on the information bits; and driving an output device (e.g., a display or speaker) based on the output signal.

In some embodiments, the method may also include: estimating a carrier frequency offset based on the samples $\{y(n)\}$; applying a frequency correction to the samples $\{y(n)\}$ based on the estimated carrier frequency offset prior to the downsampling operations.

BRIEF DESCRIPTION OF THE DRAWINGS

A better understanding of the present invention can be obtained when the following detailed description of the preferred embodiments is considered in conjunction with the following drawings.

Figure 1A:
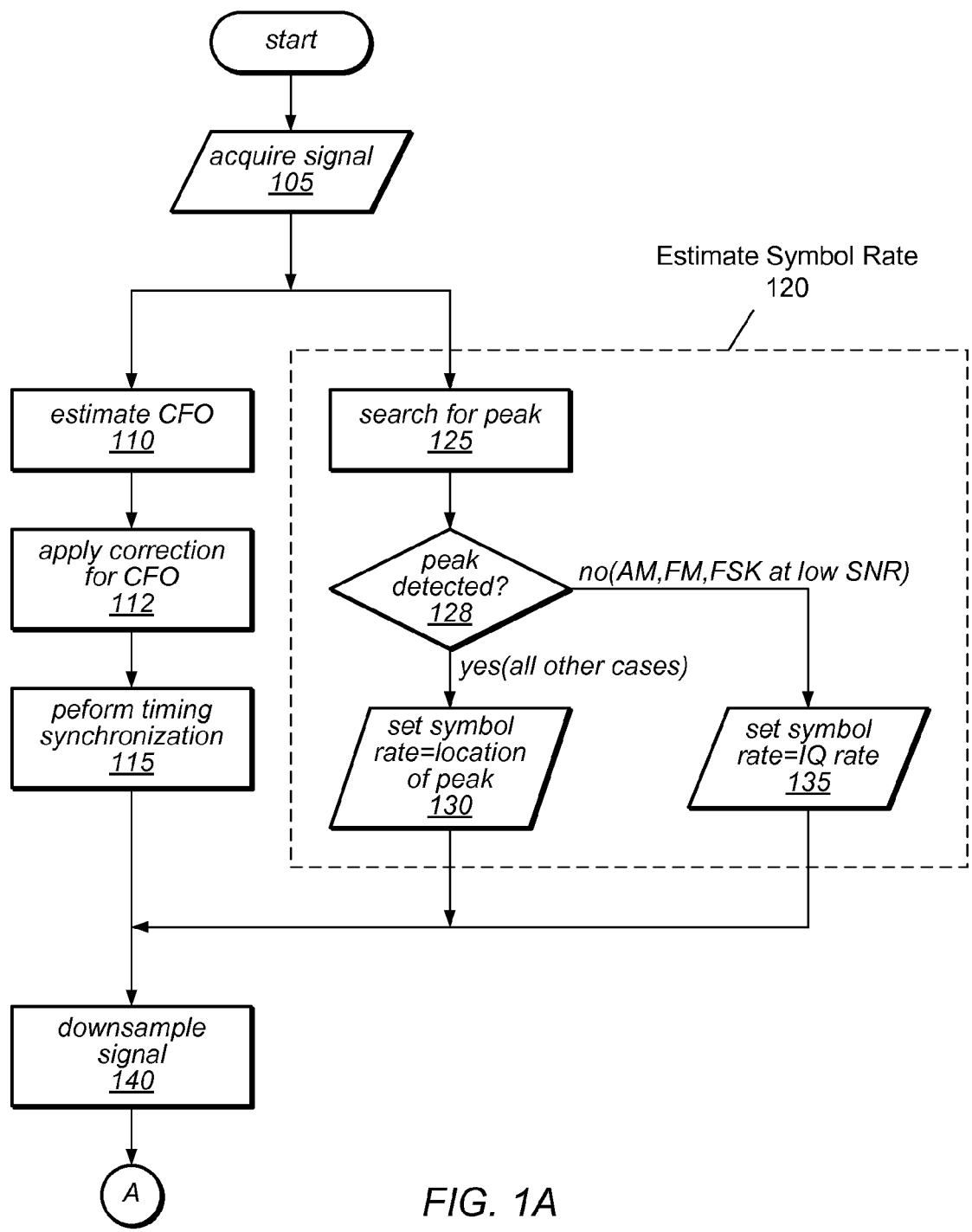
FIGS. 1A and 1B show a flow chart for performing modulation-type identification according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Programmable Hardware Element—a hardware device that includes multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. As used herein, the term "program" includes within its scope of meaning: 1) a software program which is stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor or computer system. Exemplary software programs include: programs written in text-based programming languages such as C, C++, Java™, Pascal, Fortran, Perl, etc.; graphical programs (programs written in graphical programming languages); assembly language programs; programs that have been compiled to machine language; scripts; and other types of executable software. A software program may comprise two or more subprograms that interoperate in a specified manner.

Hardware Configuration Program—a program, e.g., a netlist or bit file, that can be used to program or configure a programmable hardware element.

Graphical Program—A program comprising a plurality of interconnected nodes or icons, where the plurality of interconnected nodes or icons visually indicate the functionality of the program. A graphical program is a type of diagram.

The following provides examples of various aspects of graphical programs. The following examples and discussion are not intended to limit the above definition of graphical program, but rather provide examples of what the term "graphical program" encompasses.

The nodes in a graphical program may be connected in one or more of a data flow, control flow, and/or, execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as a receiver (e.g., an RF receiver) or a receiver front end, a signal processing board, a modem, a network interface (e.g., a wireless network interface), a unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, where the connections between the nodes indicate that data produced by one node is used by another node.

Node—In the context of a graphical program, an element that may be included in a graphical program. A node may have an associated icon that represents the node in the graphical program, as well as underlying code and/or data that implements functionality of the node. Exemplary nodes include function nodes, sub-program nodes (sub-VIs), terminal nodes, structure nodes, etc. Nodes may be connected together in a graphical program by connection icons or wires.

Graphical User Interface—this term is intended to have the full breadth of its ordinary meaning. The term "Graphical User Interface" is often abbreviated to "GUI". A GUI may include one or more input GUI elements, one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses.

A GUI may comprise a single window having one or more GUI Elements, or may comprise more than one window, each having one or more GUI Elements.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and that enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input, and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, switches, text input boxes, numeric input fields, etc.

Output Indicator—a graphical user interface element for displaying output from a program. Exemplary output indicators include charts, graphs, gauges, text output boxes, numeric displays, etc. An output indicator is sometimes referred to as an "output control".

Computer System—any of various types of computing or processing systems, including a personal computer (PC), a mainframe computer system, a workstation, a laptop, a network appliance, an Internet appliance, a hand-held or mobile device, a personal digital assistant (PDA), a television system, a grid computing system, or other device or combinations of devices. In general, the term "computer system" can be broadly defined to encompass any device (or combination of devices) having at least one processor that is configured to execute instructions that are stored on a memory medium.

Measurement Device—includes instruments, data acquisition devices, smart sensors and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card, a video capture board, a smart camera, a motion control device, a robot having machine vision, and other similar types of devices. Exemplary "stand-alone" instruments include oscilloscopes, multimeters, signal analyzers, signal demodulators, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, e.g., may receive and analyze data, and issue automation control signals in response.

Embodiments of the present inventions may be realized in any of various forms. For example, any of the present inventions may be realized as a computer-implemented method, a computer-readable memory medium, or a computer system. Furthermore, any of the present inventions may be realized using one or more custom-designed hardware devices such as ASICs.

A computer-readable memory medium is a memory medium that stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may include a processor (or a set of processors) and a memory medium. The memory medium stores program instructions. The processor is configured to read and execute the program instructions from the memory medium. The program instructions are executable by the processor to implement a method, e.g., any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a tablet computer, a wearable computer, a computer integrated in a head-mounted display, etc.

In some embodiments, a set of computers distributed across a computer network may be configured to partition the effort of executing a computational method (e.g., any of the method embodiments disclosed herein).

In some embodiments, a first computer may be configured to receive a modulated signal, down-convert the modulated signal to baseband, and capture samples of the baseband signal. The first computer may send the captured samples to a second computer through the computer network. The second computer may operate on the signal samples according to any of the method embodiments described herein, or, any combination of the method embodiments described herein, or, any subset of any of the method embodiments described herein, or, any combination of such subsets.

The following is a list of acronyms used herein.
AM Amplitude Modulation
AM-SSB AM-Single Side Band
ASK Amplitude Shift Keying
BPSK Binary Phase Shift Keying CFO Carrier Frequency Offset
DFT Discrete Fourier Transform
FFT Fast Fourier Transform
FM Frequency Modulation
FSK Frequency Shift Keying
PSK Phase Shift Keying
QAM Quadrature Amplitude Modulation
SNR Signal to Noise Ratio In one set of embodiments, the present invention operates in the context of a receiver designed to intercept signals where important features/parameters like symbol rate, modulation scheme are not known in advance. In some embodiments, the present invention includes a method for determining the modulation scheme associated with a received signal without any a priori knowledge of whether the modulation scheme is analog or digital in nature. In some embodiments, the present invention operates in the presence of, and compensates for, carrier frequency offsets up to 15% of the signal bandwidth. Furthermore, in the case digital modulation schemes, the present invention may operate without a priori knowledge of symbol rate and/or symbol timing offset.

Figure 1B:
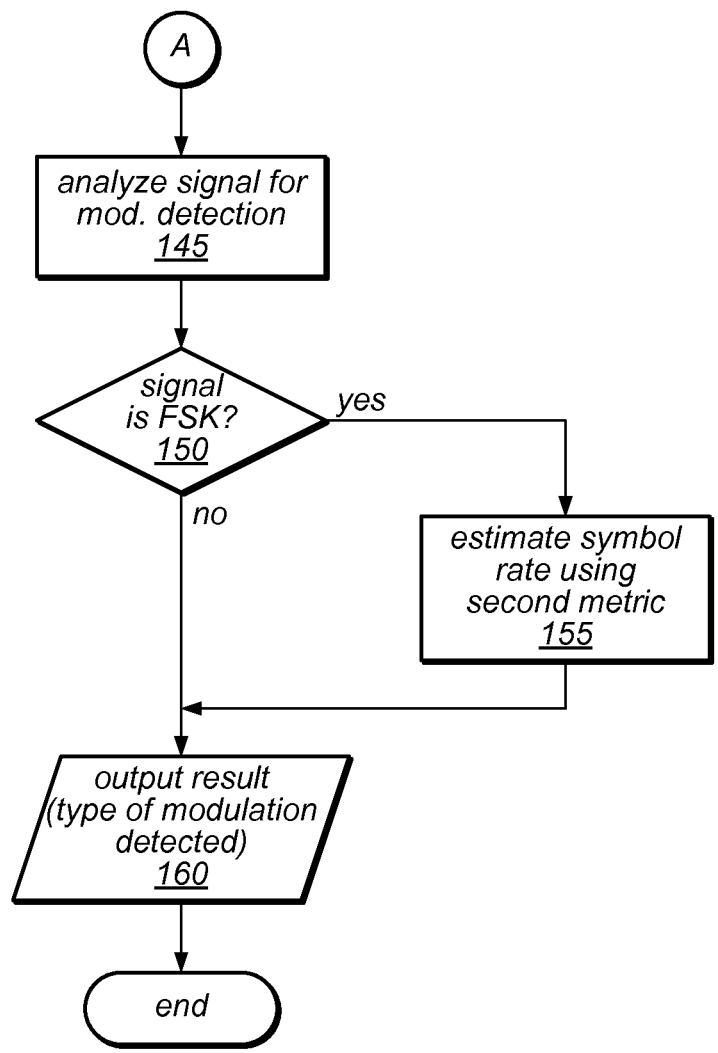

FIGS. 1A and 1B illustrate one embodiment of a method for determining the modulation scheme inherent in a received signal. The method operates on a sequence $\{y(n)\}$ of samples of the received signal. The samples are complex numbers and are acquired at a known sampling rate. The sampling rate is also referred to herein as the IQ rate. In the case of digitally-modulated signal, the sampling rate is preferably higher than the symbol rate.

At 105, the received signal $\{y(n)\}$ is acquired. For example, a set of samples of the received signal may be captured into an input buffer. At 110, an estimate of carrier frequency offset (CFO) is computed based on the received signal. At 112, the received signal is frequency corrected based on the estimated carrier frequency offset. At 115, two candidates for symbol timing offset are computed based on the frequency corrected signal. At 120, an estimate of symbol rate is computed based on the received signal. Process 120 includes a peak search 125, a decision 128, a first assignment operation 130 and a second assignment operation 135. At 140, the frequency-corrected signal is downsampled twice, i.e., once with each of the two candidates for symbol timing offset. At 145, the downsampled signals are analyzed to identify the modulation type (also referred to herein as "modulation scheme"). At 150, a test is performed to determine if the identified modulation type is FSK. If the identified modulation type is FSK, the symbol rate is estimated using a second technique, as indicated at 155. At 160, the modulation type may be outputted, e.g., displayed to the user, or, forwarded to a demodulation process. The various operations shown in FIGS. 1A and 1B are described in detail below.

Carrier Frequency Offset Estimation and Correction (110 and 112)

In some situations, carrier frequency offset (CFO) correction is required because the local carrier frequency generated by the receiver does not exactly match the carrier frequency inherent in the received signal. Without CFO correction, the received baseband samples are rotated from their actual positions in the complex plane, thus creating a circularly-smeared constellation diagram for any given modulation scheme. The CFO correction is required to shift the baseband signal samples back to their original positions. In some embodiments, the CFO correction may include the following operations.

1. The received baseband sequence $\{y(n)\}$ is passed through an eighth-order non-linearity. The resulting sequence $\{y(n)^8\}$ is transformed to the frequency domain using a discrete Fourier transform (DFT), e.g., a Fast Fourier Transform (FFT). The magnitude spectrum $S(\omega)$ corresponding the transform is then computed, where $\omega$ denotes frequency. In other words, $S(\omega)$ may be computed based on the expression:

$$S(\omega)=|DFT\{y(n)^8\}|. \tag{1}$$

It is noted that any of the DFTs described herein may be performed using an FFT.

The frequency location $\omega_{MAX}$ of the maximal peak of the magnitude spectrum $S(\omega)$ is displaced from zero frequency ($\omega=0$) by an amount proportional to the carrier frequency offset $\Delta\omega$:

$$\omega_{MAX}=c\Delta\omega. \tag{2}$$

The proportionality constant c equals 8 times the resolution bandwidth of the magnitude spectrum $S(\omega)$. (Resolution bandwidth is defined as the frequency spacing between two consecutive bins in the signal spectrum.)

2. To avoid latching on to spurious local peaks, the frequency $\omega_{MAX}$ where the magnitude spectrum $S(\omega)$ attains its maximum value is determined, and then, the kurtosis of the magnitude spectrum $S(\omega)$ over an interval $[\omega_1,\omega_2]$ centered around the frequency $\omega_{MAX}$ is calculated. For example, in one embodiment, the kurtosis is computed over an interval including the 15 points on each side of the maximum. However, it should be understood that the interval width admits a wide range of variation.

The kurtosis of a distribution is defined as $\mu_4/\sigma^4-3$, where $v_4$ is the fourth moment about the mean and $\sigma$ is the standard deviation.

The above-calculated kurtosis value is tested to determine if it is greater than a threshold $T_K$. (Kurtosis may be interpreted as a measure of sharpness. The threshold test is performed to determine if the identified peak is sufficiently sharp.) The threshold $T_K$ may be selected so as to detect only the sharp global peak due to the carrier frequency offset and not the local maxima that arise in case of frequency modulations such as FSK and FM. In one embodiment, the threshold $T_K=15$ has been shown to work at a signal-to-noise ratio of 10 dB or higher. However, it should be understood that the threshold value admits a wide range of variation. In one embodiment, threshold $T_K$ is user-specified. In another embodiment, the threshold $T_K$ is dynamically adjustable by the user.

3. If the peak at frequency $\omega_{MAX}$ passes the kurtosis test (i.e., if the kurtosis value is greater than the threshold $T_K$), the frequency $\omega_{MAX}$ is used to calculate the carrier frequency offset $\Delta\omega$, e.g, according to above-stated proportionality. If the peak at frequency $\omega_{MAX}$ fails the kurtosis test, the carrier frequency offset is set equal to zero ($\Delta\omega\leftarrow0$), and thus, the carrier frequency offset is left uncompensated.

4. A frequency correction is applied to the received baseband samples $\{y(n)\}$ in order to compensate for the carrier frequency offset. The frequency correction may be performed based on the expression:

$$v(n)=y(n)\exp(-jn\Delta\omega). \tag{3}$$

The samples $\{v(n)\}$ are the frequency-corrected samples.

Symbol Rate Estimation (120)

Digitally-modulated signals have an underlying symbol rate. Before such a signal can be downsampled to the symbol rate, the symbol rate must be estimated or known a priori. One method for estimating the symbol rate based on the complex baseband signal $\{v(n)\}$, i.e., the frequency-corrected samples, involves the following operations.

1. The frequency spectrum T(f) of the squared envelope of the complex baseband signal v(n) is computed. The frequency spectrum T(f) is given by the expression:

$$T(f)=DFT\{v_I^2(n)+v_Q^2(n)\}, \quad (4)$$

where f is frequency, where $v_I(n)$ and the $v_Q(n)$ are respectively the real and imaginary parts of v(n):

$$v(n)=v_I(n)+jv_Q(n),$$

where j is Euler's constant.

2. The frequency spectrum T(f) is analyzed in the frequency domain to determine a frequency interval which contains Q percent of the total power in spectrum T(f). For example, in one embodiment, an interval of the form $[f_C-z/2, f_C+z/2]$ may be expanded by increasing variable z until the interval covers Q percent of the power in the spectrum T(f). In one embodiment, the frequency $f_C$ may be set equal to the center of the spectrum.

In one embodiment, Q=85. However, the power percentage parameter Q may vary considerably from one embodiment to the next.

The width of the frequency interval which contains Q percent of the total power in spectrum T(f) is referred to herein as the occupied bandwidth (OBW).

3. Allowing for some flexibility due to impairments in the received signal, the range of search for the symbol rate is chosen to be an interval of the form

[$k_1$OBW, $k_2$OBW], where scalar $k_1$ is a less than one and scalar $k_2$ is greater than one. For example, in one embodiment, the search range is the range from OBW/2 to 2.0*OBW, i.e., $k_1$=½ and $k_2$=2.0. (However, each of the values $k_1$ and $k_2$ may vary considerably. A wide variety of other combinations of values are possible.) The search process may search within this range for a peak such that the ratio of the peak magnitude to the average spectrum magnitude within the search range is larger than a certain threshold. In one embodiment, the peak magnitude is required to be 16 dB above the average spectrum magnitude. However, the magnitude threshold may vary from one embodiment to the next. A wide variety of values are contemplated for the magnitude threshold.

4. For linearly modulated schemes such as ASK, PSK, FSK and QAM, there will be single sharp peak in the spectrum T(f) within the search range. The search process identifies that peak. The frequency location of that peak constitutes an estimate of the symbol rate.

5. If the search process fails to find a peak satisfying the above-stated peak magnitude criteria, that failure indicates the received signal is either analog modulated (AM or FM) or FSK at low SNR (e.g., lower than 20 dB SNR). When the search process fails to find a peak satisfying the above-stated peak magnitude criteria, the symbol rate estimate may be set equal to the sampling rate.

Symbol Timing Offset Estimation (115)

Symbol timing estimation attempts to determine the offset to be used for downsampling the oversampled signal to the symbol-rate, i.e., to one sample per symbol. This estimation step is useful because it allows inter-symbol interference (ISI) to be minimized when downsampling. The symbol timing estimation may involve the following operations.

Step 1: Compute the metric g(N) based on the following expression:

$$g(N) = \frac{N}{4\pi}\arg\left[\left(\sum_i v^2(i)\exp(2\pi i/N)\right)\left(\sum_i v^2(i)\exp(-2\pi i/N)\right)^*\right], \quad (5)$$

where N is an oversampling factor. The oversampling factor N is determined from the known sampling rate $f_S$ and the estimated symbol rate $f_{SYM}$ according to the relation $N=f_S/f_{SYM}$.

Step 2: Check if g(N) is positive. This done by using a threshold $T_g$ that is slightly greater than zero (e.g., $T_g$=0.5 in one embodiment) to ensure resilience against small amplitude noise around zero.

Step 3: If g(N) is greater than the threshold $T_g$, the timing offset (modulo half symbol duration) is $$h(N)=N-\text{nint}(N/2-g(N)), \quad (6)$$

where nint denotes the nearest integer function. If g(N) is not greater than the threshold $T_g$, the timing offset (modulo half symbol duration) is $$h(N)=N+\text{nint}(g(N)). \quad (7)$$

Step 4: The optimium timing offset is either dt*h(N) or dt*(h(N)+N/2), where dt is the sampling period. The timing offset may be compensated (modulo half symbol duration) by deleting h(N) samples from the beginning of the array of samples {v(n)}. After this sample deletion, the optimum timing offset (to be used when downsampling the sample array) is either 0 or (N/2)*dt. In some embodiments, downsampling is performed twice, i.e., once with each of the two candidate offset values. For example, the downsampling based on zero offset may be performed simply by keeping only every $N^{th}$ sample (starting with the first sample). The downsampling based on the offset (N/2)*dt may be performed by discarding N/2 samples of the array {v(n)} (in addition to the h(N) samples that have already been discarded) and then keeping only every $N^{th}$ sample.

Note that the above-described method for symbol timing offset estimation reduces the number of candidates for timing offset from N (i.e., 0*dt, 1*dt, 2*dt, . . . , (N−1)*dt) to just two.

Modulation Identification (140 and 145)

The aim of modulation identification is to identify the modulation scheme used in the acquired signal. The modulation identification may be performed as follows.

1. Downsample the signal {v(n)} to symbol rate based on an estimated value of the symbol rate and one of the two estimated values of symbol timing offset. The downsampling process produces a symbol sequence {w(n)}.

2. Normalize the symbol sequence {w(n)} with respect to average power, e.g., by scaling the symbol sequence {w(n)} so that the scaled sequence {x(n)} has average power equal to one. In other words, $$x(n)=k_Nw(n), \quad (8)$$

where $k_N$ is selected so that {x(n)} has average power equal to one.

3. Compute the DFT of normalized sequence {x(n)} to obtain spectrum X(f), and compute the DFT of {x(n)²} to obtain spectrum Z(f):

$$X(f)=DFT\{x(n)\} \quad (9)$$

$$Z(f)=DFT\{x(n)^2\}. \quad (10)$$

4. The following set of features {Vi} is calculated using the normalized sequence {x(n)}, the spectrum X(f) and the spectrum Z(f).

V1. Normalized variance of $\{|x(n)|^2\}$. The normalized variance of $\{|x(n)|^2\}$ is defined as the variance of $\{|x(n)|^2\}$ divided by the mean of $\{|x(n)|^2\}$ or by the square root of the mean.

V2. Kurtosis of a centered and normalized version of the instantaneous frequency signal $\{\omega(n)\}$. The instantaneous frequency signal $\{\omega(n)\}$ is the instantaneous frequency of signal $\{x(n)\}$. The instantaneous frequency signal $\{\omega(n)\}$ may be derived from the signal $\{x(n)\}$ by computing a phase signal $\{\phi(n)\}$ corresponding to $\{x(n)\}$ and then computing a first derivative of the phase signal $\{(\phi(n)\}$:

$$\tan \phi(n) = x_I(n)/x_R(n) \qquad (11)$$

$$\omega(n) = d\phi/dn. \qquad (12)$$

where $x_R(n)$ is the real part of $x(n)$, and $x_I(n)$ is the imaginary part of $x(n)$.

The instantaneous frequency signal $\{w(n)\}$ may be centered and normalized by computing the average of $\{\omega(n)\}$ and subtracting the average from each value of $\{\omega(n)\}$ to obtain a centered sequence and then dividing the entire centered sequence by $\max(\{\omega(n)\})$.

V3. Skewness of a centered and normalized version of the magnitude sequence $\{|x(n)|\}$. The magnitude sequence is defined by:

$$|x(n)| = SQRT(x_I(n)^2 + x_R(n)^2). \qquad (13)$$

V4. The maximum of the following set of sixth-order cumulants:

$$\{C_{63}(x(n)), C_{63}(x(n)^2), C_{63}(x(n)^4)\}. \qquad (14)$$

V5. The sixth-order cumulant $C_{63}(x(n))$ defined as follows:

$$C_{63}(x(n)) = E[|x(n)|^6] - 6(E[|x(n)|^2])^3 - 9E[|x(n)|^2](E[|x(n)|^4] - 2|E[x(n)^2]|^2 - (E[|x(n)|^2])^2) \qquad (15)$$

where E denotes the expectation operator. (The expectation $E[a(n)]$ of a sequence $\{a(n)\}$ may be computed by taking an average of the values $a(n)$ over the index n.)

V6. First, partition the sequence $\{x(n), n<N\}$ into 2P subsets: for $k=0, 1, 2, \ldots, 2P-1$, $$A_k = \left\{x'(k, n) = x\left(k\frac{N}{2P} + n\right), n = 0, 1, \ldots, \frac{N}{2P} - 1\right\}. \qquad (16)$$

Second, compute $B'(k,j) = |DFT_{N/2P}\{(x'(k,n))^4\}|$, where j is a frequency index. Compute $X'(k,j)$ by locating the maximum element in $B'(k,j)$ as a function of index j and then setting that element equal to zero. Third, use Skewness$_j\{E_k[X'(k+P,j)(X'(k,j))^*]\}$ as the value V6. The notation $E_k$ indicates that the expectation is to be computed with respect to index k. The Skewness$_j$ indicates that the skewness is to be computed with respect to index j.

V7. Normalized Variance of $\{E_k[X'(k+P,j)(X'(k,j))^*]\}$.

V8. Variance of $\{(2|arg(x^4(n)(x^4(n-1))^*)|)\%(2\pi)\}$, where "%" denotes "modulo", where $arg(z)$ denotes the argument (angle) of the complex quantity z, where the superscript "*" denotes complex conjugation.

V9. The maximum of PL and PR, where PL is the ratio of power in the left half of the frequency spectrum $X(f)$ to the total power in the frequency spectrum $X(f)$, where PR is the ratio of power in the right half of the frequency spectrum $X(f)$ to the total power. The right half of the spectrum $X(f)$ is restriction of the spectrum $X(f)$ to positive frequencies (f>0). The left half of the spectrum $X(f)$ is restriction of the spectrum $X(f)$ to negative frequencies (f<0).

V10. The magnitude $|X(0)|$ of the spectrum $X(f)$ at zero frequency (f=0). In step 5 below, the magnitude $|X(0)|$ will be tested to determine if it is greater than a specified threshold $T_{10}$. If $|X(0)|$ is greater than the threshold $T_{10}$, this indicates the presence of a peak at zero frequency.

V11. Variance of $$\left\{\frac{|x(n) - E(x(n))|}{RMS(|x(n) - E(x(n))|)}\right\},$$

where RMS denotes "root mean square".

5. After calculating the above-defined values Vi, the values Vi are compared to corresponding threshold values Ti. In one set of embodiments, the comparisons Ki are of the form:

| | |
|---|---|
| K1: $V1 < T_1$ | K2: $V2 < T_2$, |
| K3: $V3 < T_3$ | K4: $V4 < T_4$, |
| K5: $V5 \geq T_5$ | K6: $V6 < T_6$, |
| K7: $V7 < T_7$ | K8: $V8 < T_8$, |
| K9: $V9 > T_9$ | K10: $V10 > T_{10}$, |
| K11: $V11 > T_{11}$. | |

The results of the comparisons are used to determine the modulation type inherent in the received signal. In one exemplary embodiment, the threshold values are set as follows: $T_1=0.35$, $T_2=2.95$, $T_3=0.6$, $T_4=5.5$, $T_5=4.6$, $T_6=2$ (with P=10), $T_7=0.09$, $T_8=2.27$, $T_9=0.9$, $T_{10}=5$ dB, $T_{11}=0.08$. However, it should be understood that the present invention is not limited to this combination of values, and that each of the thresholds admits significant variation.

The modulation type may be determined based on the following decision logic.

a) "FM": K1=TRUE AND K2=FALSE AND K4=TRUE.
b) "AM": K1=FALSE.
c) "AM-SSB": K9=TRUE.
d) "ASK": NOT "AM" AND K3=TRUE AND K10=TRUE.
e) "FSK": K1=TRUE AND K2=TRUE.
f) "PSK/QAM": NOT "AM" AND K4=FALSE AND K10=FALSE.
g) "BPSK": NOT "AM" AND K4=FALSE AND K10=FALSE AND K5=TRUE.
h) "QPSK": NOT "AM" AND K4=FALSE AND K10=FALSE AND K5=FALSE and K6=TRUE and K8=FALSE and K7=TRUE.
i) "8-PSK": NOT "AM" AND K4=FALSE AND K10=FALSE AND K5=FALSE and K6=TRUE and K8=TRUE and K7=TRUE AND K11=FALSE.
j) "QAM": NOT "AM" AND K4=FALSE AND K10=FALSE AND K5=FALSE and K6=TRUE and K7=FALSE and K11=TRUE.

This determination of modulation type assumes that the downsampling performed in step 1 was with the correct symbol timing offset. Since the above-described estimation of the symbol timing offset results in two candidate values, the signal $\{v(n)\}$ is downsampled twice, i.e., once with the first of the two values, and once with the second of the two values. This results in two symbol sequences which are respectively denoted $\{w_1(n)\}$ and $\{w_2(n)\}$. Steps 2-5 above are applied to each of the symbol sequences. The following decision logic is then used to determine the correct modulation type based on the modulation type results for the two symbol sequences.

A. If the result for both symbol sequences is "AM", then the actual modulation type is "AM".

B. If the result is "AM" for only one of the two symbol sequences, then the actual modulation type is the modulation type result of the other symbol sequence (i.e., the non-AM symbol sequence).

C. The actual modulation type t for a signal is BPSK, QPSK, 8-PSK or QAM only if for both symbols sequences: (1) the generic "PSK/QAM" test (i.e., test (f)) gives a positive result, and, (2) the specific test for the modulation type t gives a positive result. For example, the actual modulation type is BPSK only if for both symbol sequences: the generic "PSK/QAM" test gives a positive result, and the BPSK test (test (g)) gives a positive result.

Second Symbol Rate Estimation Method (150 and 155)

If the above-described process of modulation type determination results in determination that the modulation type is FSK, symbol rate estimation may be performed using the following method which is based on the cyclic second-order statistics of the frequency-corrected signal $\{v(n)\}$. (The symbol rate estimation is necessary if the user desires the received FSK signal to be demodulated.)

1. A function $f(\alpha)$ is calculated over a range of $\alpha$ based on the expression:

$$f(\alpha) = \log \sum_{j=0}^{K-1} \left| \sum_{n=0}^{M-K-1} v^*(n)v(n+j)\cos(2\pi\alpha n) \right|^2. \quad (17)$$

M is the number of samples in the frequency-corrected signal $\{v(n)\}$. The function $f(\alpha)$ exhibits a sharp peak at the value of $\alpha$ which corresponds to the inverse of the oversampling factor. Hence, a search is performed for a maxima in the derivative of $f(\alpha)$. The derivative of $f(\alpha)$ is denoted $f'(\alpha)$. K is a design parameter. In one embodiment, K=1000 is sufficient to achieve successful detection at an SNR of 10 dB. However, the parameter K may take any value of a wide range of values.

2. The first derivative function $f'(\alpha)$ is computed over a range of $\alpha$ values which is governed by the OBW. For example, in one embodiment, the range is:

$$OBW/(2*fs) < \alpha < OBW/(0.5*fs), \quad (18)$$

where fs is the sampling rate of the acquired signal. Since the derivative function $f'(\alpha)$ sharply rises at exactly the point corresponding to the reciprocal of the oversampling factor, a fine search (e.g., a very fine search) is recommended. In some embodiments, the resolution of the search may be adjustable and/or may be set by the user. The finer the resolution of the search, the lower will be the residual sampling clock frequency offset.

The derivative function value $f'(\alpha)$ may be computed using any of a variety of numerical differentiation formulas. For example, in one embodiment, $f'(\alpha)$ is computed based on the expression:

$$f'(\alpha) = (f(\alpha) - f(\alpha - \Delta\alpha))/\Delta\alpha.$$

3. Since the oversampling factor N is the ratio of the rate of acquisition of signal (a known receiver parameter) and the symbol rate, the symbol rate estimate can then be calculated from the maximizing value of $\alpha$:

$$f_{SYM} = \alpha_{MAX} f_S \quad (19)$$

4. The frequency-corrected signal $\{v(n)\}$ may be downsampled to the estimated symbol rate $f_{SYM}$. The downsampling produces a symbol sequence $\{z(n)\}$. FSK demodulation may be performed on the symbol sequence $\{z(n)\}$ to obtain information bits. The information bits may be used to generate an output signal, and the output signal may be provided to an output device (e.g., a display device or a speaker).

Figure 2:
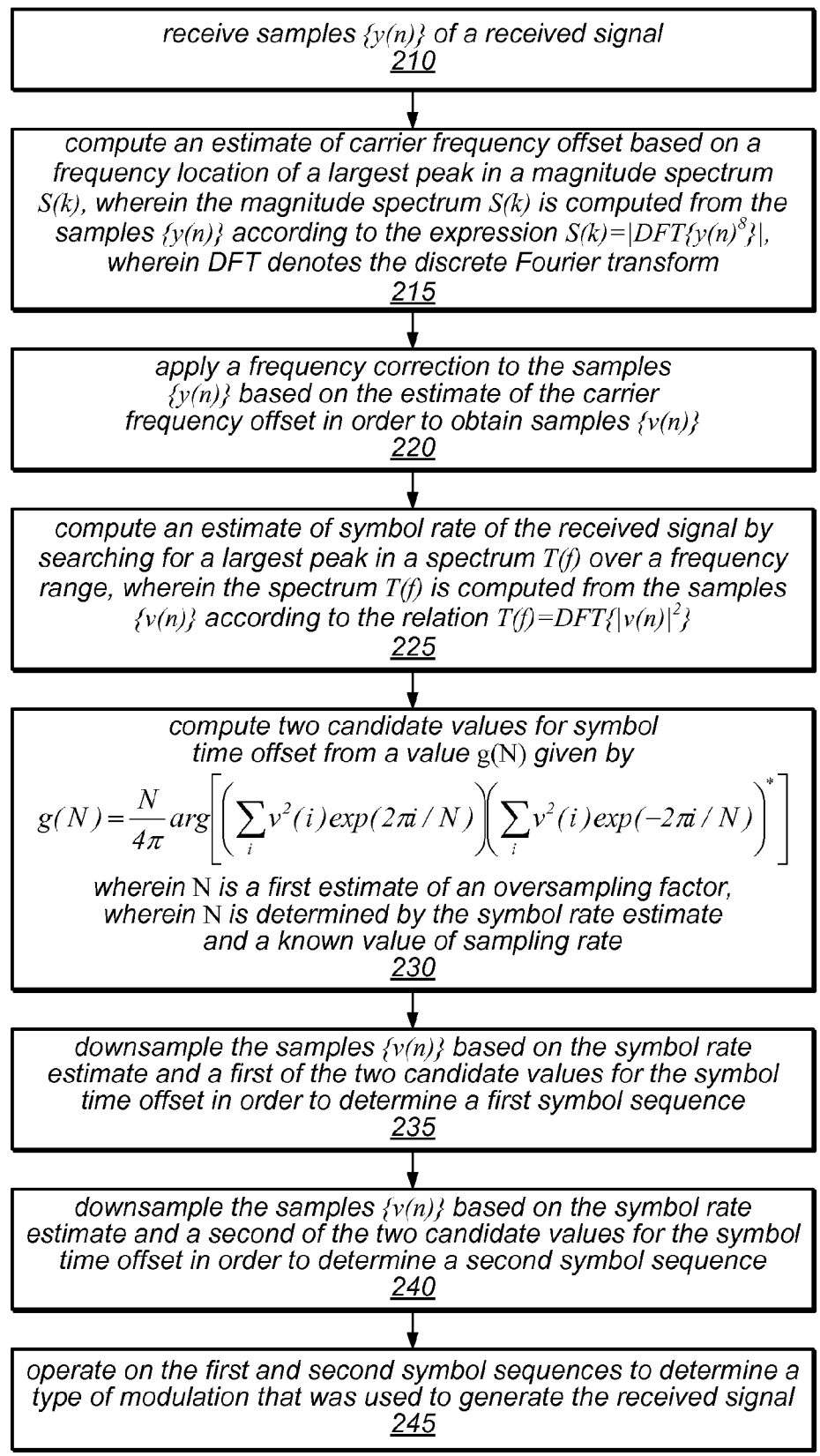
FIG. 2 illustrates one embodiment of a method for estimating carrier frequency offset, for correcting the carrier frequency offset, for estimating a symbol rate, for estimating symbol offset time, and for performing modulation-type identification.

In one set of embodiments, a method for performing modulation type identification may involve the operations shown in FIG. 2.

At 210, a computer system may receive samples $\{y(n)\}$ of a received signal. For example, the computer system may receive the samples $\{y(n)\}$ from a receiver (or the baseband portion of a receiver).

At 215, the computer system may compute an estimate of carrier frequency offset based on a frequency location of a largest peak in a magnitude spectrum $S(k)$, e.g., as described above. The magnitude spectrum $S(k)$ may be computed from the samples $\{y(n)\}$ according to the expression $S(k)=|DFT\{y(n)^8\}|$, wherein DFT denotes the discrete Fourier transform.

At 220, the computer system may apply a frequency correction to the samples $\{y(n)\}$ based on the estimate of the carrier frequency offset in order to obtain samples $\{v(n)\}$. The frequency correction may be performed as described above. See equation (3). The frequency correction attempts to remove the carrier frequency offset from the samples $\{y(n)\}$.

At 225, the computer system may compute an estimate of symbol rate of the received signal by searching for a largest peak in a spectrum $T(f)$ over a frequency range, e.g., as described above. The spectrum $T(f)$ may be computed from the samples $\{v(n)\}$ according to the relation $T(f)=DFT\{|v(n)|^2\}$. The frequency $f_P$ of the largest peak represents the estimate for the symbol rate of the received signal.

At 230, the computer system may compute two candidate values for symbol time offset from a value $g(N)$ given by $$g(N) = \frac{N}{4\pi} \arg\left[\left(\sum_i v^2(i)\exp(2\pi i/N)\right)\left(\sum_i v^2(i)\exp(-2\pi i/N)\right)^*\right],$$

wherein N is a first estimate of an oversampling factor, wherein N is determined by the symbol rate estimate and a known value of sampling rate. The two candidate values may be computed, e.g., as described above in connection with expressions (6) and (7).

At 235, the computer system may downsample the samples $\{v(n)\}$ based on the symbol rate estimate and a first of the two candidate values for the symbol time offset in order to determine a first symbol sequence. This downsampling operation may be performed as described above.

At 240, the computer system may downsample the samples $\{v(n)\}$ based on the symbol rate estimate and a second of the two candidate values for the symbol time offset in order to determine a second symbol sequence. This downsampling operation may be performed as described above.

At 245, the computer system may operate on the first and second symbol sequences to determine a type of modulation that was used to generate the received signal. This process of operating on the first and second symbol sequences may be performed as variously described herein.

In some embodiments, the action of computing the estimate of the carrier frequency offset may include determining that a kurtosis of the magnitude spectrum $S(k)$ in a neighborhood of the frequency location is larger than a threshold. The neighborhood may be a closed interval extending a number of samples on both sides of the frequency location, e.g., as described above.

In some embodiments, the frequency range for the search is of the form

[$k_1$OBW, $k_2$OBW], wherein scalar $k_1$ is less than one, wherein scalar $k_2$ is greater than one, e.g., as described above.

In some embodiments, the method of FIG. 2 may also include displaying an indication of the modulation type via a display device.

In some embodiments, the method of FIG. 2 may also include: demodulating the first symbol sequence or the second symbol sequence based on the determined modulation type to recover information bits; and driving an output device with an output signal derived from the information bits. In one embodiment, the method may include demodulating both symbol sequences to obtain corresponding bit streams, and analyzing the bits streams to determine which one contains higher information quality. This determination may be performed with user assistance. For example, the computer system may display (or present or output) each bit stream to the user, and allow the user to decide which one contains information of higher quality.

In some embodiments, the method of FIG. 2 may also include: in response to a determination that the modulation type is FSK, searching for a value $\alpha_{MAX}$ that maximizes a first derivative of function $f(\alpha)$ over a range of $\alpha$ of the form

[$c_1$OBW/$f_S$, $c_2$OBW/$f_S$], e.g., as described above. Frequency $f_S$ is the known value of the sampling rate. Scalar $c_1$ is less than one, and scalar $c_2$ is greater than one.

The function $f(\alpha)$ is given by the expression:

$$f(\alpha) = \log \sum_{j=0}^{K-1} \left| \sum_{n=0}^{M-K-1} v^*(n) v(n+j) \cos(2\pi\alpha n) \right|^2,$$

wherein K is a positive integer, wherein M is a positive integer, wherein an inverse of $\alpha_{MAX}$ represents a second estimate of the oversampling factor. The samples {v(n)} may be downsampled to symbol rate using the second estimate of the oversampling factor.

Figure 3:
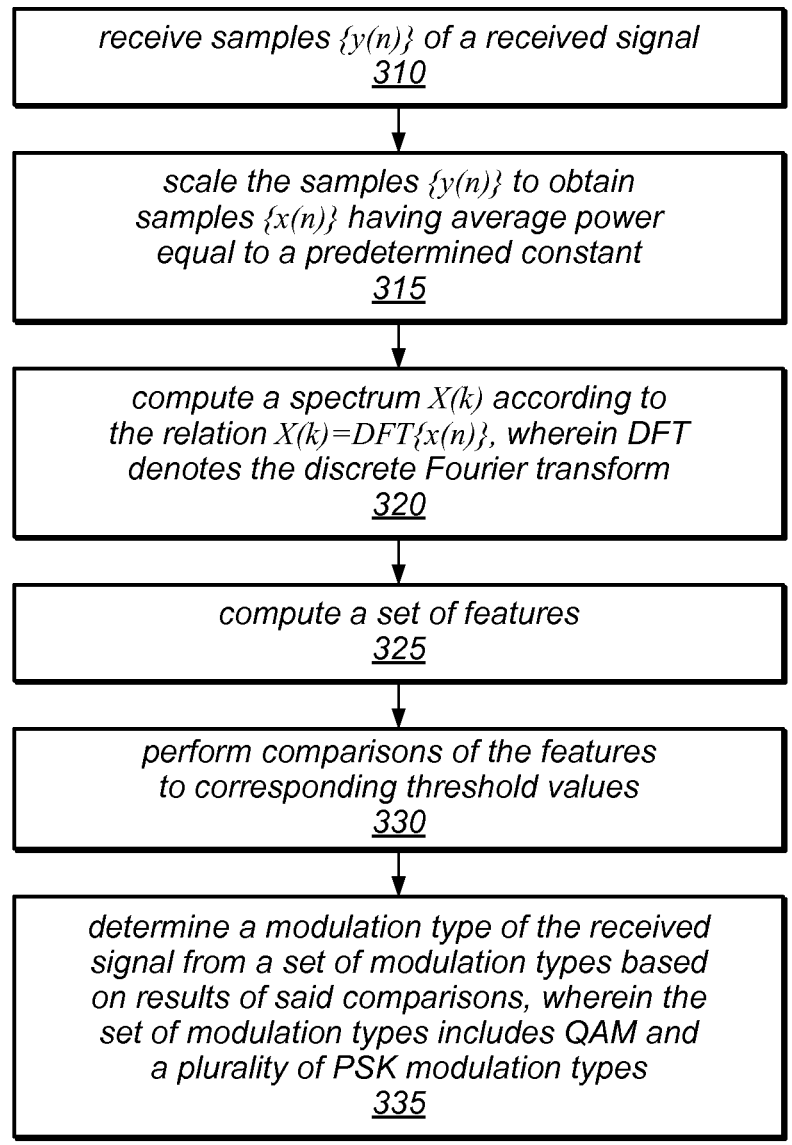
FIG. 3 illustrates one embodiment of a method for performing modulation-type identification.

In one set of embodiments, a method for performing modulation type identification may involve the operations shown in FIG. 3.

At 310, a computer system may receive samples {y(n)} of a received signal.

At 315, the computer system may scale the samples {y(n)} to obtain samples {x(n)} having average power equal to a predetermined constant, e.g., as described above.

At 320, the computer system may compute a spectrum X(k) according to the relation X(k)=DFT{x(n)}, e.g., as described above.

At 325, the computer system may compute a set of features. The set of features may include the following (or any subset thereof):

a maximum of a set of sixth order cumulants given by {$C_{63}(x(n))$, $C_{63}(x(n)^2)$, $C_{63}(x(n)^4)$};

the sixth order cumulant $C_{63}(x(n))$;

a skewness relative to index j of a first sequence given by {$E_k[X'(k+P,j)(k,j)^*]$}, wherein $E_k$ denotes an expected value relative to index k, where X'(k,j) is a magnitude spectrum derived from an initial spectrum B'(k,j)=|DFT$_{N/2P}${$x^4$(n+kN/2P)}| by deleting a maximum element from the initial spectrum, wherein DFT$_{N/2P}$ denotes an N/2P-point discrete Fourier transform;

a normalized variance of the first sequence;

a variance of a second sequence given by {2|arg($x^4$(n)($x^4$(n−1))*)|mod(2π)};

a variance of a third sequence given by $$\left\{ \frac{|x(n) - E(x(n))|}{\text{RMS}(|x(n) - E(x(n))|)} \right\};$$

and a magnitude |X(0)| of the spectrum X(k) at zero frequency.

At 330, the computer system may perform comparisons of the features to corresponding threshold values to obtain corresponding comparison results, e.g., as described above.

At 335, the computer system may determine a modulation type of the received signal from a set of modulation types based on the results of said comparisons, e.g., as described variously above. The set of modulation types may include QAM and a plurality of PSK modulation types.

In some embodiments, the plurality of PSK modulation types may include at least BPSK, QPSK and 8-PSK.

In some embodiments, the method of FIG. 3 may also include: demodulating the received signal according to the determined modulation type in order to recover information bits; generating an output signal based on the information bits; and driving an output device such as a display or speaker based on the output signal.

In some embodiments, the set of modulation types may also include FM, AM, AM-SSB, ASK and FSK. Furthermore, the set of features may also include one or more or all of the following: a normalized variance of {|x(n)|$^2$}; a kurtosis of a centered and normalized version of an instantaneous frequency signal {ω(n)}, wherein the instantaneous frequency signal is derived from the samples {x(n)}; a skewness of a centered and normalized version of {|x(n)|}; and a maximum of PL and PR, wherein PL is a normalized power associated with a left half of the spectrum X(k), wherein PR is a normalized power associated with a right half of the spectrum X(k).

Figure 4:
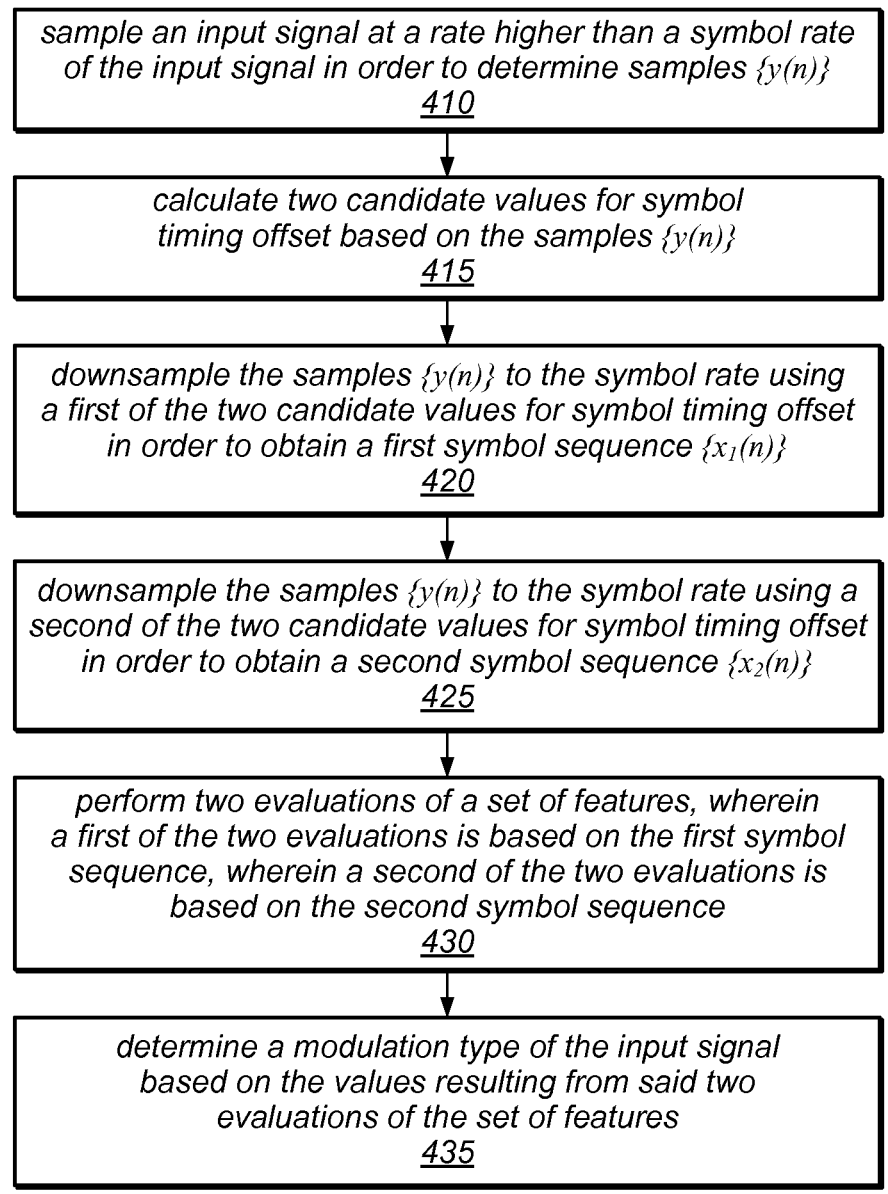
FIG. 4 illustrates one embodiment of a method for performing modulation-type identification.

In one set of embodiments, a method for performing modulation type identification may involve the operations shown in FIG. 4.

At 410, a computer system may sample an input signal at a rate higher than a symbol rate of the input signal in order to determine samples {y(n)}, e.g., at some integer multiple or scalar multiple of the symbol rate.

At 415, the computer system may calculate two candidate values for symbol timing offset based on the samples {y(n)}, e.g., as variously described above.

At 420, the computer system may downsample the samples {y(n)} to the symbol rate using a first of the two candidate values for symbol timing offset in order to obtain a first symbol sequence {$x_1$(n)}, e.g., as described above.

At 425, the computer system may downsample the samples {y(n)} to the symbol rate using a second of the two candidate values for symbol timing offset in order to obtain a second symbol sequence {$x_2$(n)}, e.g., as described above.

At 430, the computer system may perform two evaluations of a set of features, wherein a first of the two evaluations is based on the first symbol sequence, wherein a second of the two evaluations is based on the second symbol sequence.

In terms of a given symbol sequence {x(n)} as argument, the set of features may include the following (or any subset thereof): a maximum of a set of sixth order cumulants given by {$C_{63}(x(n))$, $C_{63}(x(n)^2)$, $C_{63}(x(n)^4)$}; the sixth order cumulant $C_{63}(x(n))$; a skewness relative to index j of a first sequence given by {$E_k[X'(k+P,j)X'(k,j)^*]$}, wherein $E_k$ denotes an expected value relative to index k, where X'(k,j) is a magnitude spectrum derived from an initial spectrum B'(k, j)=|DFT$_{N/2P}$ {x$^4$(n+kN/2P)}| by deleting a maximum element from the initial spectrum, wherein DFT$_{N/2P}$ denotes an N/2P-point discrete Fourier transform; a normalized variance of the first sequence; a variance of a second sequence given by {2|arg(x$^4$(n)(x$^4$(n−1))*)|mod(2π)}; and a variance of a third sequence given by $$\left\{ \frac{|x(n) - E(x(n))|}{\text{RMS}(|x(n) - E(x(n))|)} \right\}.$$

At 435, the computer system may determine a modulation type of the input signal based on the values resulting from the two evaluations of the set of features, e.g., as variously described above.

In some embodiments, the method of FIG. 4 may also include: demodulating the samples {x$_1$(n)} or the samples {x$_2$(n)} according to the determined modulation type in order to recover information bits; generating an output signal based on the information bits; and driving an output device (e.g., a display or speaker) based on the output signal. In one embodiment, the method may include demodulating both symbol sequences to obtain corresponding bit streams, and analyzing the bits streams to determine which one contains higher information quality. This determination may be performed with user assistance. For example, the computer system may display/present/output each bit stream to the user, and allow the user to decide which one contains information of higher quality, e.g., decide which output signal sounds more like human speech, or, which displayed text string appears more like a human-generated text string, or, which displayed image appears more like an original source image.

In some embodiments, the method of FIG. 4 may also include: estimating a carrier frequency offset based on the samples {y(n)}, e.g., as variously described above; and applying a frequency correction to the samples {y(n)} based on the estimated carrier frequency offset prior to the downsampling operations, e.g., as described above.

In one set of embodiments, a method for correcting of carrier frequency offset may include: receiving samples {y(n)} of a received signal; computing an estimate of carrier frequency offset based on a frequency location of a largest peak in a magnitude spectrum S(k), where S(k) is computed from the samples {y(n)} according to the expression S(k)=|DFT{y(n)$^8$}|, wherein DFT denotes the discrete Fourier transform; and applying a frequency correction to the samples {y(n)} based on the estimate of the carrier frequency offset in order to obtain samples {v(n)}.

In one set of embodiments, a method for estimating a symbol rate may include searching for a largest peak in a spectrum T(f) over a frequency range, e.g., as described variously above. The spectrum T(f) may be computed from the samples {v(n)} according to the relation T(f)=DFT{|v(n)|$^2$}. The frequency f$_P$ of the largest peak represents the estimate for the symbol rate of the received signal.

In one set of embodiments, a method for computing two candidate values for symbol timing offset of a received signal may include computing a value g(N) given by $$g(N) = \frac{N}{4\pi} \arg\left[ \left( \sum_i v^2(i) \exp(2\pi i / N) \right) \left( \sum_i v^2(i) \exp(-2\pi i / N) \right)^* \right],$$

wherein N is a first estimate of an oversampling factor, wherein N is determined by the symbol rate estimate and a known value of sampling rate. The two candidate values may be computed, e.g., as described above in connection with expressions (6) and (7).

Figure 5:
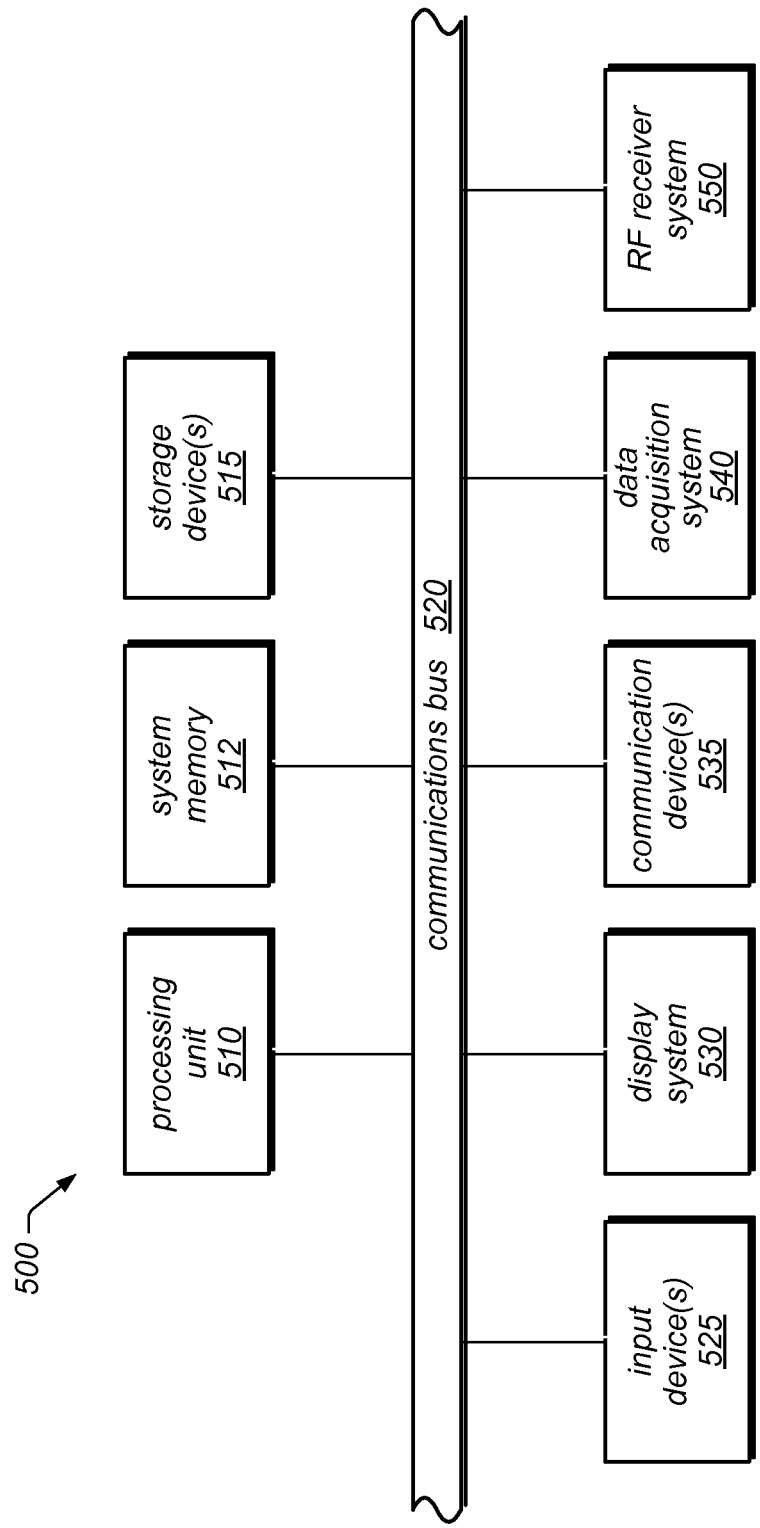
FIG. 5 illustrates one embodiment of a computer system may be used to perform any of the method embodiments described herein.

FIG. 5 illustrates one embodiment of a computer system 500 that may be used to perform any of the method embodiments described herein, or, any combination of the method embodiments described herein, or any subset of any of the method embodiments described herein, or, any combination of such subsets.

Computer system 500 may include a processing unit 510, a system memory 512, a set 515 of one or more storage devices, a communication bus 520, a set 525 of input devices, and a display system 530.

System memory 512 may include a set of semiconductor devices such as RAM devices (and perhaps also a set of ROM devices).

Storage devices 515 may include any of various storage devices such as one or more memory media and/or memory access devices. For example, storage devices 915 may include devices such as a CD/DVD-ROM drive, a hard disk, a magnetic disk drive, magnetic tape drives, etc.

Processing unit 510 is configured to read and execute program instructions, e.g., program instructions stored in system memory 512 and/or on one or more of the storage devices 515. Processing unit 510 may couple to system memory 512 through communication bus 520 (or through a system of interconnected busses). The program instructions configure the computer system 500 to implement a method, e.g., any of the method embodiments described herein, or, any combination of the method embodiments described herein, or, any subset of any of the method embodiments described herein, or any combination of such subsets.

Processing unit 510 may include one or more processors (e.g., microprocessors).

One or more users may supply input to the computer system 500 through the input devices 525. Input devices 525 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 530 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 500 may include other devices, e.g., devices such as one or more graphics accelerators, one or more speakers, a sound card, a video camera and a video card.

In some embodiments, computer system 500 may include one or more communication devices 535, e.g., a network interface card for interfacing with a computer network. In one embodiment, such a communication device may be used to receive a modulated signal and perform signal processing operations on the modulated signal, e.g., signal processing operations according to any of the method embodiments described herein.

In some embodiments, the communication devices may include a reconfigurable I/O (RIO) board that includes one or more programmable hardware elements (PHEs), one or more A/D converters and additional circuitry. The RIO board is programmable to achieve a user-desired configuration of input and/or output processing, e.g., via a program written using LabVIEW FPGA. In some embodiments, the additional circuitry of the RIO board may include circuitry optimized for various kinds of signal processing operations and/or circuitry configured for signal amplification, carrier generation and synchronization, clock signal generation and synchronization, RF down-conversion, any of various kinds of demodulation, etc. The RIO board may receive an input signal, down-convert the input signal to baseband, digitize the baseband signal, and make the digitized baseband samples available to the computer system 500 for further processing, e.g., processing according to any of the method embodiments disclosed herein.

In some embodiments, the reconfigurable I/O board is one of the RIO boards provided by National Instrument Corporation.

The computer system may be configured with a software infrastructure including an operating system, and perhaps also, one or more graphics APIs (such as OpenGL®, Direct3D, Java 3D™). In some embodiments, the software infrastructure may include LabVIEW and/or LabVIEW FPGA, which are software products of National Instruments Corporation.

In some embodiments, the computer system 500 may be configured for coupling to a data acquisition system 540. The data acquisition system 540 is configured to receive analog inputs signals, to digitize the analog input signals, and to make those digitized signals available to the computer system 500. The data acquisition system 540 may operate under the control of the software executing on processor 510.

In some embodiments, the computer system 500 may be configured to interface with a specialized receiver system 550, e.g., an off-the-shelf receiver system designed for capturing radio signals (such as RF signals, wireless LAN signals, etc.), down-converting the captured signals, and sampling the down-converted signals.

Figure 6:
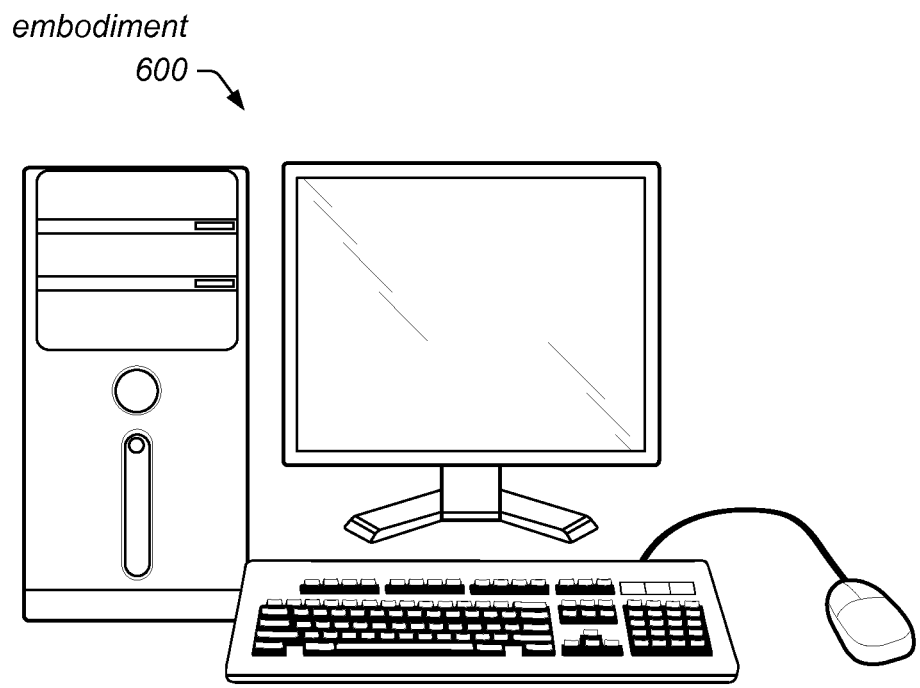
FIG. 6 illustrates one embodiment of the computer system of FIG. 5.

FIG. 6 illustrates one possible embodiment 500A of computer system 500.

Figure 7:
FIG. 7 illustrates an exemplary wireless signal interceptor device that is configured to intercept signal transmissions, e.g., unauthorized or enemy signal transmissions.

Any of the method embodiments described herein (or any combination thereof, or any portion of any of the method embodiments described herein, or any combination of such portions) may be configured to operate as part of a signal interceptor device, e.g., as shown in FIG. 7. The signal interceptor device 720 is configured to intercept (receive) wireless signals transmitted by a transmitter 710. Transmitter 710 may be an unauthorized transmitter or an enemy transmitter. The modulation type used by the transmitter 710 is not known a priori by the signal interceptor device 710. The signal interceptor device may use any of the method embodiments described herein to determine the modulation type of the intercepted wireless signal. The determined modulation type may be used to demodulate the intercepted wireless signal and thereby recover transmitted information. The transmitted information may be useful to government regulatory personnel in their efforts to identify (and shut down) unauthorized transmitters, or, to military personnel in gathering military intelligence.

Figure 8:
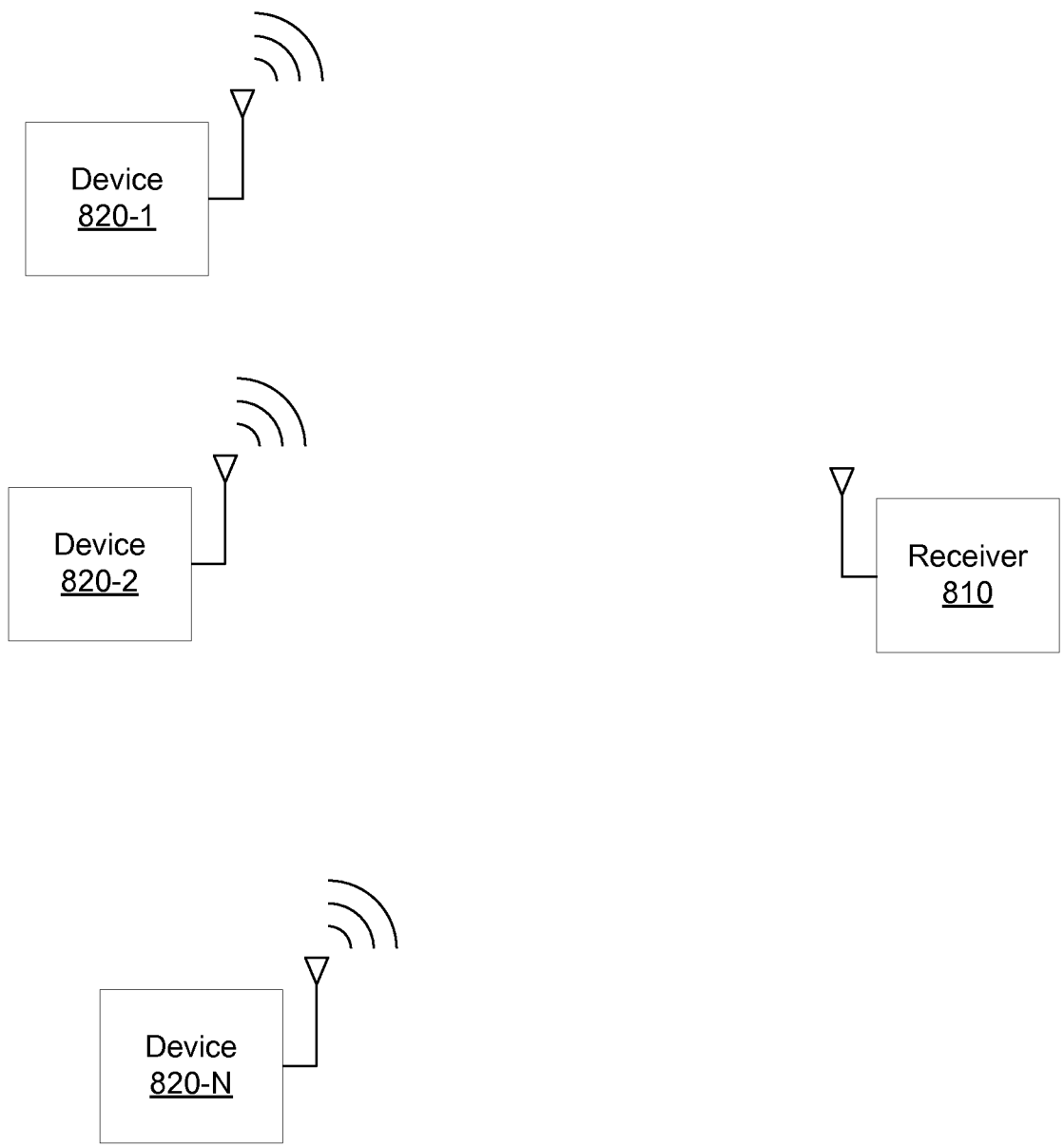
FIG. 8 illustrates one embodiment of a universal receiver device 810 capable of receiving from a plurality of transmitters that utilize a plurality of modulation types.

FIG. 8 illustrates one embodiment of a universal receiver (or transceiver) device 810, i.e., universal in the sense that it is capable of receiving signals from transmitters (or transceivers) that use a wide variety of modulation types, e.g., modulation types as described above. Device 810 is configured to receive signals from a variety of different transmitter (or transceiver) devices 820-1 through 820-N. The transmitter devices 820-1 through 820-N employ a variety of different modulation types to generate their respective transmit signals. Device 810 uses any of the various method embodiments described herein to determine the modulation type of each received signal. Device 810 may use the determined modulation types to demodulate the received signals to recover corresponding data streams. The data streams (or any subset thereof) may be made available to a user/operator through an output device such as a speaker and/or display. Thus, a user/operator of device 810 is enabled to receive from (or communicate with) transmitters (or transceivers) that use any of wide variety of modulation types.

In one embodiment, one or more of the transmitters 820-1 through 820-N are configured to switch from one modulation type to another, e.g., in real time. Device 810 may utilize any of the method embodiments described herein to track the changes in modulation type in the signal(s) received from any one (or more) of the transmitters.

Figure 9A:
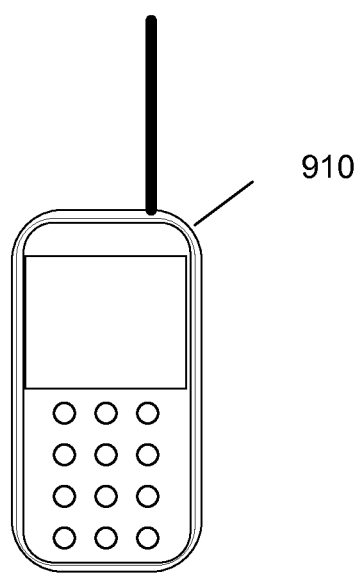
FIGS. 9A and 9B illustrate two handheld wireless phone embodiments of a transceiver according to the present invention.
Figure 9B:
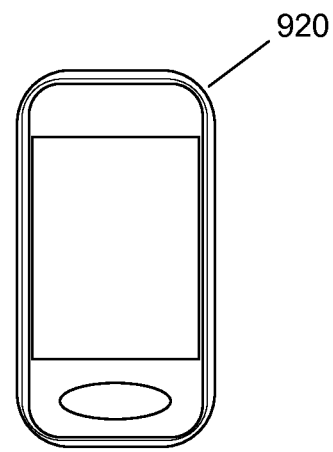

FIGS. 9A and 9B illustrate two handheld wireless phone embodiments (910 and 920) that are configured to use any of the method embodiments described herein to determine the modulation type of a received signal and to then demodulate the received signal based on the determined modulation type. Such phones are capable of flexibly receiving and demodulating signals from transmitters (e.g., phones or base stations) that utilize a plurality of different modulation types. It should be noted that devices according the present invention(s) are not limited to phone applications or wireless applications or handheld device applications. A wide variety of other types of applications are contemplated.

In some embodiments, any of the method embodiments described herein or any combination thereof may be used as part of a test and measurement application in order to achieve automatic detection of modulation schemes in standards that employ multiple modulation schemes. A unit under test generates a transmit signal that could be any of the multiple modulation schemes. A test and measurement system receives the transmit signal and employs any one or more of the herein disclosed methods to automatically detect the employed modulation scheme.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
receiving samples $\{y(n)\}$ of a received signal;
computing an estimate of carrier frequency offset based on a frequency location of a largest peak in a magnitude spectrum $S(k)$, wherein the magnitude spectrum $S(k)$ is computed from the samples $\{y(n)\}$ according to the expression $S(k)=|DFT\{y(n)^8\}|$, wherein $y(n)^8$ denotes an 8th order non-linearity, wherein DFT denotes the discrete Fourier transform;
applying a frequency correction to the samples $\{y(n)\}$ based on the estimate of the carrier frequency offset in order to obtain samples $\{v(n)\}$;
computing an estimate of symbol rate of the received signal by searching for a largest peak in a spectrum $T(f)$ over a frequency range, wherein the spectrum $T(f)$ is computed from the samples $\{v(n)\}$ according to the relation $T(f)=DFT\{|v(n)|^2\}$;
computing two candidate values for symbol time offset from a value $g(N)$ given by $$g(N) = \frac{N}{4\pi}\arg\left[\left(\sum_i v^2(i)\exp(2\pi i/N)\right)\left(\sum_i v^2(i)\exp(-2\pi i/N)\right)^*\right],$$

wherein N is a first estimate of an oversampling factor, wherein N is determined by the symbol rate estimate and a known value of sampling rate;

downsampling the samples $\{v(n)\}$ based on the symbol rate estimate and a first of the two candidate values for the symbol time offset in order to determine a first symbol sequence; and downsampling the samples $\{v(n)\}$ based on the symbol rate estimate and a second of the two candidate values for the symbol time offset in order to determine a second symbol sequence;

operating on the first and second symbol sequences to determine a type of modulation that was used to generate the received signal; and displaying an indication of the modulation type via a display device.

2. The method of claim 1, wherein said computing the estimate of the carrier frequency offset includes determining that a kurtosis of the magnitude spectrum S(k) in a neighborhood of the frequency location is larger than a first threshold.

3. The method of claim 1, wherein the frequency range for said search is of the form $[k_1 \text{OBW}, k_2 \text{OBW}]$, wherein scalar $k_1$ is less than one, wherein scalar $k_2$ is greater than one, wherein a frequency fp of the largest peak represents the estimate for the symbol rate of the received signal.

4. The method of claim 1 further comprising:
in response to a determination that the modulation type is FSK, searching for a value $\alpha_{max}$ that maximizes a first derivative of function $f(\alpha)$ over a range of $\alpha$ of the form $[c_1 \text{OBW}/f_S, c_2 \text{OBW}/f_S]$, wherein $f_S$ is the known value of the sampling rate, wherein scalar $c_1$ is less than one, wherein scalar $c_2$ is greater than one, wherein $f(\alpha)$ is given by the expression:

$$f(\alpha) = \log\sum_{j=0}^{K-1}\left|\sum_{n=0}^{M-K-1}v^*(n)v(n+j)\cos(2\pi\alpha n)\right|^2$$

wherein K is a positive integer, wherein M is a positive integer, wherein an inverse of $\alpha_{MAX}$ represents a second estimate of the oversampling factor;

downsampling the samples $\{v(n)\}$ using the second estimate of the oversampling factor.

5. A method comprising:
receiving samples $\{y(n)\}$ of a received signal;
scaling the samples $\{y(n)\}$ to obtain samples $\{x(n)\}$ having average power equal to a predetermined constant;
computing a spectrum X(k) according to the relation $X(k) = DFT\{x(n)\}$, wherein DFT denotes the discrete Fourier transform;
computing a set of features including:
a maximum of a set of sixth order cumulants given by $\{C_{63}(x(n)), C_{63}(x(n)^2), C_{63}(x(n)^4)\}$;
the sixth order cumulant $C_{63}(x(n))$;
a skewness relative to index j of a first sequence given by $\{E_k[X'(k+P, j)X'(k,j)^*]\}$, wherein $E_k$ denotes an expected value relative to index k, where X'(k,j) is a magnitude spectrum derived from an initial spectrum $B'(k,j) = |DFT_{N/2P}\{x^4(n+kN/2P)\}|$ by deleting a maximum element from the initial spectrum, wherein $DFT_{N/2P}$ denotes an N/2P-point discrete Fourier transform;
a normalized variance of the first sequence;
a variance of a second sequence given by $\{2|\arg(x^4(n)(x^4(n-1))^*)|\mod(2\pi)\}$;
a variance of a third sequence given by $$\left\{\frac{|x(n) - E(x(n))|}{\text{RMS}(|x(n) - E(x(n))|)}\right\};$$

a magnitude |X(0)| of the spectrum X(k) at zero frequency;
performing comparisons of the features to corresponding threshold values;
determining a modulation type of the received signal from a set of modulation types based on results of said comparisons, wherein the set of modulation types includes QAM and a plurality of PSK modulation types; and
displaying an indication of the modulation type via a display device.

6. The method of claim 5, wherein the plurality of PSK modulation types include BPSK, QPSK and 8-PSK.

7. The method of claim 6, wherein the set of modulation types also includes FM, AM, AM-SSB, ASK and FSK, wherein the set of features also includes:
a normalized variance of $\{|x(n)|^2\}$;
a kurtosis of a centered and normalized version of an instantaneous frequency signal $\{\omega(n)\}$, wherein the instantaneous frequency signal is derived from the samples $\{x(n)\}$;
a skewness of a centered and normalized version of $\{|x(n)|\}$; and
a maximum of PL and PR, wherein PL is a normalized power associated with a left half of the spectrum X(k), wherein PR is a normalized power associated with a right half of the spectrum X(k).

8. A method comprising:
sampling an input signal at a rate higher than a symbol rate of the input signal in order to determine samples $\{y(n)\}$;
calculating two candidate values for symbol timing offset based on the samples $\{y(n)\}$;
downsampling the samples $\{y(n)\}$ to the symbol rate using a first of the two candidate values for symbol timing offset in order to obtain a first symbol sequence $\{x_1(n)\}$;
downsampling the samples $\{y(n)\}$ to the symbol rate using a second of the two candidate values for symbol timing offset in order to obtain a second symbol sequence $\{x_2(n)\}$;
performing two evaluations of a set of features, wherein a first of the two evaluations is based on the first symbol sequence, wherein a second of the two evaluations is based on the second symbol sequence, wherein, in terms of a given symbol sequence $\{x(n)\}$, said set of features includes:
a maximum of a set of sixth order cumulants given by $\{C_{63}(x(n)), C_{63}(x(n)^2), C_{63}(x(n)^4)\}$;
the sixth order cumulant $C_{63}(x(n))$;
a skewness relative to index j of a first sequence given by $\{E_k[X'(k+P,j)X'(k,j)^*]\}$, wherein $E_k$ denotes an expected value relative to index k, where X'(k,j) is a magnitude spectrum derived from an initial spectrum $B'(k,j) = |DFT_{N/2P}\{x^4(n+kN/2P)\}|$ by deleting a maximum element from the initial spectrum, wherein $DFT_{N/2P}$ denotes an N/2P-point discrete Fourier transform;
a normalized variance of the first sequence;

a variance of a second sequence given by $\{2|\arg(x^4(n)(x^4(n-1))^*)|\mod(2\pi)\}$;
a variance of a third sequence given by $$\left\{\frac{|x(n) - E(x(n))|}{\text{RMS}(|x(n) - E(x(n))|)}\right\};$$

determining a modulation type of the input signal based on the values resulting from said two evaluations of the set of features; and
displaying an indication of the modulation type via a display device.

9. A non-transitory computer-readable memory medium storing program instructions, wherein the program instructions, when executed by a computer system, cause the computer system to:
receive samples $\{y(n)\}$ of a received signal;
compute an estimate of carrier frequency offset based on a frequency location of a largest peak in a magnitude spectrum S(k), wherein the magnitude spectrum S(k) is computed from the samples $\{y(n)\}$ according to the expression $S(k)=|DFT\{y(n)^8\}|$, wherein $y(n)^8$ denotes an 8th order non-linearity, wherein DFT denotes the discrete Fourier transform;
apply a frequency correction to the samples $\{y(n)\}$ based on the estimate of the carrier frequency offset in order to obtain samples $\{v(n)\}$;
compute an estimate of symbol rate of the received signal by searching for a largest peak in a spectrum T(f) over a frequency range, wherein the spectrum T(f) is computed from the samples $\{v(n)\}$ according to the relation $T(f)=DFT\{|v(n)|^2\}$;
compute two candidate values for symbol time offset from a value g(N) given by $$g(N) = \frac{N}{4\pi}\arg\left[\left(\sum_i v^2(i)\exp(2\pi i/N)\right)\left(\sum_i v^2(i)\exp(-2\pi i/N)\right)^*\right],$$

wherein N is a first estimate of an oversampling factor, wherein N is determined by the symbol rate estimate and a known value of sampling rate;
downsample the samples $\{v(n)\}$ based on the symbol rate estimate and a first of the two candidate values for the symbol time offset in order to determine a first symbol sequence; and
downsample the samples $\{v(n)\}$ based on the symbol rate estimate and a second of the two candidate values for the symbol time offset in order to determine a second symbol sequence; and
operate on the first and second symbol sequences to determine a type of modulation that was used to generate the received signal.

10. The memory medium of claim 9, wherein said computing the estimate of the carrier frequency offset includes determining that a kurtosis of the magnitude spectrum S(k) in a neighborhood of the frequency location is larger than a first threshold.

11. The memory medium of claim 9, wherein the frequency range for said search is of the form $[k_1 OBW, k_2 OBW]$, wherein scalar $k_1$ is less than one, wherein scalar $k_2$ is greater than one, wherein a frequency $f_P$ of the largest peak represents the estimate for the symbol rate of the received signal.

12. The memory medium of claim 9, wherein the program instructions, when executed by the computer system, further cause the computer system to:
display an indication of the modulation type via a display device.

13. The memory medium of claim 9, wherein the program instructions, when executed by the computer system, further cause the computer system to:
demodulate the first symbol sequence or the second symbol sequence based on the determined modulation type to recover information bits; and
drive an output device with an output signal derived from the information bits.

14. The memory medium of claim 9, wherein the program instructions, when executed by the computer system, further cause the computer system to:
in response to a determination that the modulation type is FSK, search for a value $a_x$ that maximizes a first derivative of function $f(\alpha)$ over a range of a of the form $[c_1 OBW/f_S, c_2 OBW/f_S]$, wherein $f_S$ is the known value of the sampling rate, wherein scalar $c_1$ is less than one, wherein scalar $c_2$ is greater than one, wherein $f(\alpha)$ is given by the expression:

$$f(\alpha) = \log\sum_{j=0}^{K-1}\left|\sum_{n=0}^{M-K-1} v^*(n)v(n+j)\cos(2\pi\alpha n)\right|^2$$

wherein K is a positive integer, wherein M is a positive integer, wherein an inverse of $\alpha_{MAX}$ represents a second estimate of the oversampling factor; and
downsample the samples $\{v(n)\}$ using the second estimate of the oversampling factor.

15. A non-transitory computer-readable memory medium storing program instructions, wherein the program instructions, when executed by a computer system, cause the computer system to:
receive samples $\{y(n)\}$ of a received signal;
scale the samples $\{y(n)\}$ to obtain samples $\{x(n)\}$ having average power equal to a predetermined constant;
compute a spectrum X(k) according to the relation $X(k)=DFT\{x(n)\}$, wherein DFT denotes the discrete Fourier transform;
compute a set of features including:
a maximum of a set of sixth order cumulants given by $\{C_{63}(x(n)), C_{63}(x(n)^2), C_{63}(x(n)^4)\}$;
the sixth order cumulant $C_{63}(x(n))$;
a skewness relative to index j of a first sequence given by $\{E_k[X'(k+P,j)X'(k,j)^*]\}$, wherein $E_k$ denotes an expected value relative to index k, where X'(k,j) is a magnitude spectrum derived from an initial spectrum $B'(k,j)=|DFT_{N/2P}\{x^4(n+kN/2P)\}|$ by deleting a maximum element from the initial spectrum, wherein $DFT_{N/2P}$ denotes an N/2P-point discrete Fourier transform;
a normalized variance of the first sequence;
a variance of a second sequence given by $\{2|\arg(x^4(n)(x^4(n-1))^*)|\mod(2\pi)\}$;
a variance of a third sequence given by $$\left\{\frac{|x(n) - E(x(n))|}{\text{RMS}(|x(n) - E(x(n))|)}\right\};$$

a magnitude |X(0)| of the spectrum X(k) at zero frequency;
perform comparisons of the features to corresponding threshold values; and determine a modulation type of the received signal from a set of modulation types based on results of said comparisons, wherein the set of modulation types includes QAM and a plurality of PSK modulation types.

16. The memory medium of claim 15, wherein the plurality of PSK modulation types include BPSK, QPSK and 8-PSK.

17. The memory medium of claim 16, wherein the set of modulation types also includes FM, AM, AM-SSB, ASK and FSK, wherein the set of features also includes:
  a normalized variance of $\{|x(n)|^2\}$;
  a kurtosis of a centered and normalized version of an instantaneous frequency signal $\{\omega(n)\}$, wherein the instantaneous frequency signal is derived from the samples $\{x(n)\}$;
  a skewness of a centered and normalized version of $\{|x(n)|\}$; and
  a maximum of PL and PR, wherein PL is a normalized power associated with a left half of the spectrum X(k), wherein PR is a normalized power associated with a right half of the spectrum X(k).

18. A non-transitory computer-readable memory medium storing program instructions, wherein the program instructions, when executed by a computer system, cause the computer system to:
  sample an input signal at a rate higher than a symbol rate of the input signal in order to determine samples $\{y(n)\}$;
  calculate two candidate values for symbol timing offset based on the samples $\{y(n)\}$;
  downsample the samples $\{y(n)\}$ to the symbol rate using a first of the two candidate values for symbol timing offset in order to obtain a first symbol sequence $\{x_1(n)\}$;
  downsample the samples $\{y(n)\}$ to the symbol rate using a second of the two candidate values for symbol timing offset in order to obtain a second symbol sequence $\{x_2(n)\}$;
  perform two evaluations of a set of features, wherein a first of the two evaluations is based on the first symbol sequence, wherein a second of the two evaluations is based on the second symbol sequence, wherein, in terms of a given symbol sequence $\{x(n)\}$, said set of features includes:
    a maximum of a set of sixth order cumulants given by $\{C_{63}(x(n)), C_{63}(x(n)^2), C_{63}(x(n)^4)\}$;
    the sixth order cumulant $C_{63}(x(n))$;
    a skewness relative to index j of a first sequence given by $\{E_k[X'(k+P,j)X'(k,j)^*]\}$,
    wherein $E_k$ denotes an expected value relative to index k, where X'(k,j) is a magnitude spectrum derived from an initial spectrum $B'(k,j)=|DFT_{N/2P}\{x^4(n+kN/2P)\}|$ by deleting a maximum element from the initial spectrum, wherein $DFT_{N/2P}$ denotes an N/2P-point discrete Fourier transform;
    a normalized variance of the first sequence;
    a variance of a second sequence given by $\{2|arg(x^4(n)(x^4(n-1))^*)|mod(2\pi)\}$;
    a variance of a third sequence given by $$\left\{\frac{|x(n) - E(x(n))|}{\text{RMS}(|x(n) - E(x(n))|)}\right\};$$

determine a modulation type of the input signal based on the values resulting from said two evaluations of the set of features.

19. A method comprising:
  receiving samples $\{y(n)\}$ of a received signal;
  computing an estimate of carrier frequency offset based on a frequency location of a largest peak in a magnitude spectrum S(k), wherein the magnitude spectrum S(k) is computed from the samples $\{y(n)\}$ according to the expression $S(k)=|DFT\{y(n)^8\}|$, wherein $y(n)^8$ denotes an 8th order non-linearity, wherein DFT denotes the discrete Fourier transform;
  applying a frequency correction to the samples $\{y(n)\}$ based on the estimate of the carrier frequency offset in order to obtain samples $\{v(n)\}$;
  computing an estimate of symbol rate of the received signal by searching for a largest peak in a spectrum T(f) over a frequency range, wherein the spectrum T(f) is computed from the samples $\{v(n)\}$ according to the relation $T(f)=DFT\{|v(n)|^2\}$;
  computing two candidate values for symbol time offset from a value g(N) given by $$g(N) = \frac{N}{4\pi}\arg\left[\left(\sum_i v^2(i)\exp(2\pi i/N)\right)\left(\sum_i v^2(i)\exp(-2\pi i/N)\right)^*\right],$$

wherein N is a first estimate of an oversampling factor, wherein N is determined by the symbol rate estimate and a known value of sampling rate;
    downsampling the samples $\{v(n)\}$ based on the symbol rate estimate and a first of the two candidate values for the symbol time offset in order to determine a first symbol sequence;
    downsampling the samples $\{v(n)\}$ based on the symbol rate estimate and a second of the two candidate values for the symbol time offset in order to determine a second symbol sequence;
    operating on the first and second symbol sequences to determine a type of modulation that was used to generate the received signal;
    demodulating the first symbol sequence or the second symbol sequence based on the determined modulation type to recover information bits; and
    driving an output device with an output signal derived from the information bits.

\* \* \* \* \*

UNITED STATES PATENT AND TRADEMARK OFFICE
CERTIFICATE OF CORRECTION

PATENT NO. : 8,605,830 B2  
APPLICATION NO. : 12/977491  
DATED : December 10, 2013  
INVENTOR(S) : Sethi et al.

Page 1 of 1

It is certified that error appears in the above-identified patent and that said Letters Patent is hereby corrected as shown below:

In the Claims:

Claim 4, Column 23, Line 35, please delete "of a of," and substitute -- of $\alpha$ of --;

Claim 9, Column 25, Line 50, please delete "and";

Claim 14, Column 26, Line 18, please delete "$a_x$" and substitute -- $\alpha_{MAX}$ --;

Claim 14, Column 26, Line 19, please delete "of a of," and substitute -- of $\alpha$ of --.

Signed and Sealed this  
Twenty-fifth Day of February, 2014

Michelle K. Lee  
*Deputy Director of the United States Patent and Trademark Office*